United States Patent Office 3,239,034
Patented Mar. 8, 1966

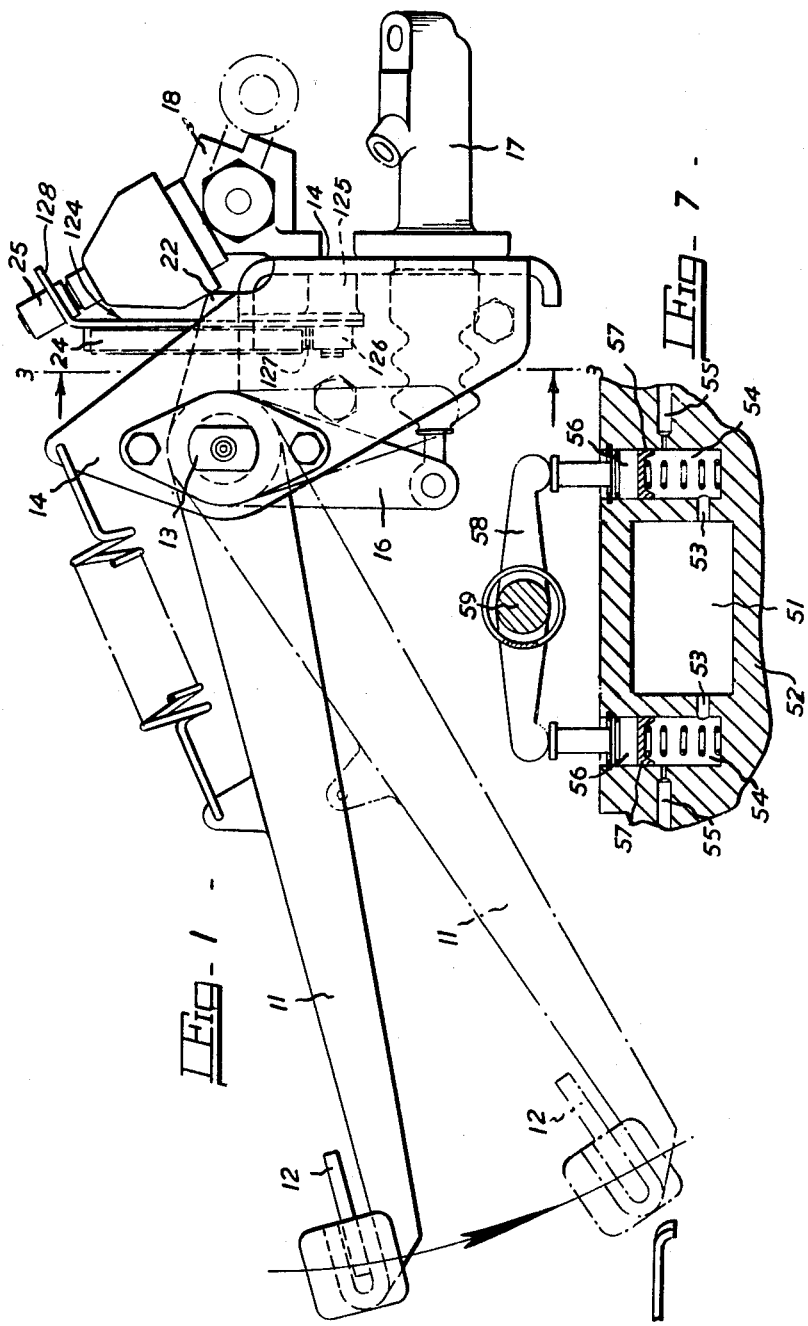
ALEXANDER J. WILSON
BY Scrivner & Parker

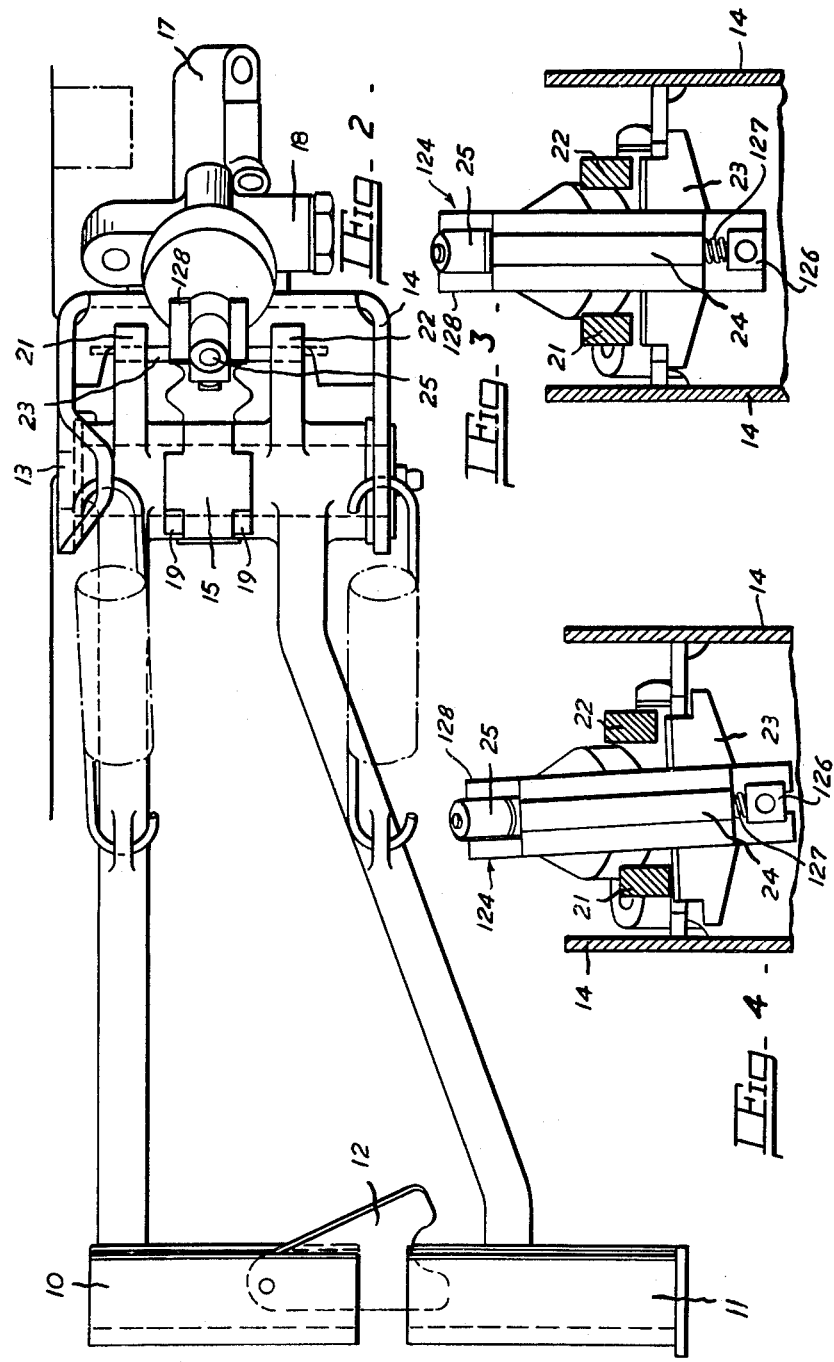

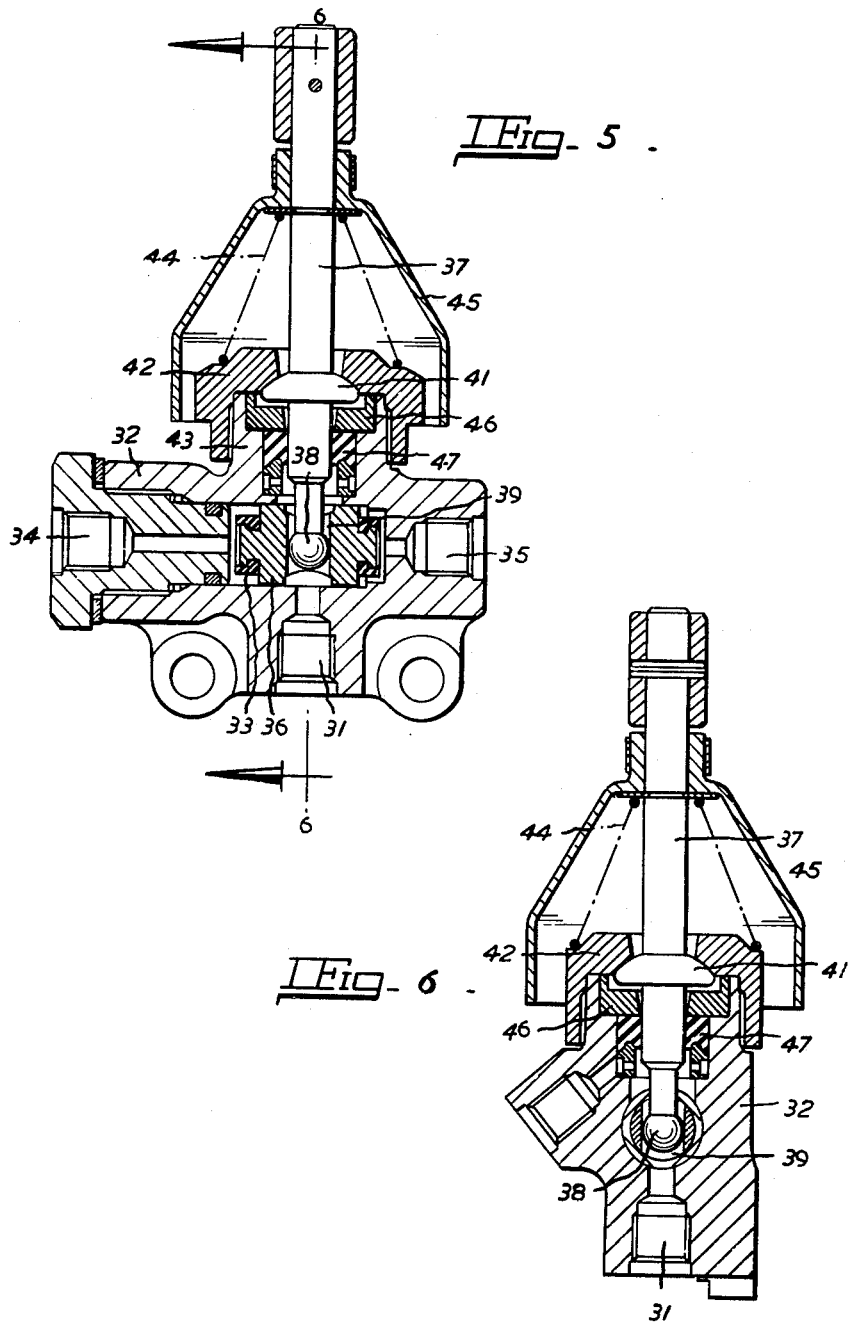

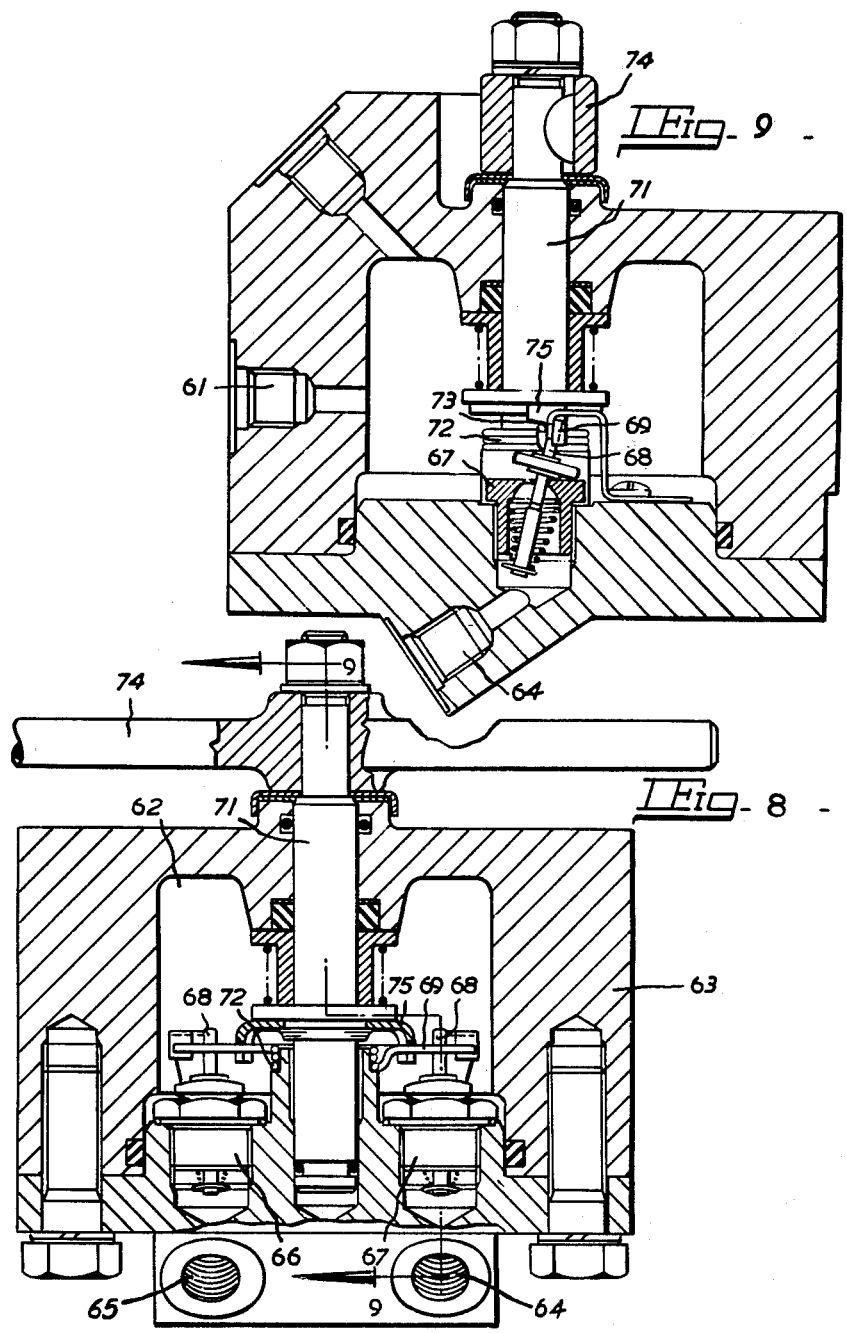

3,239,034
SELECTIVE CONTROL VALVE MECHANISM
Alexander John Wilson, Sutton Coldfield, Warwickshire, England, assignor to Girling Limited, Birmingham, England, a British company
Continuation of application Ser. No. 221,485, Sept. 5, 1962. This application July 1, 1965, Ser. No. 472,391
6 Claims. (Cl. 188—152)

This application is a continuation of my prior application, Serial No. 221,485, filed September 5, 1962, now abandoned.

This invention relates to improvements in selective control valve mechanism which is intended primarily for controlling the application of fluid pressure brakes on the wheels on opposite sides of a vehicle, such as a tractor, but can be used for other purposes where there are similar requirements.

My invention comprises a control valve system for selectively controlling the delivery to separate slave cylinders or the like of liquid from a master cylinder or other source of liquid under pressure in which normally open valves are interposed between the source of pressure liquid and separate slave cylinders or groups of slave cylinders and the valves normally allow pressure liquid to pass to both slave cylinders or groups of slave cylinders, but are selectively actuated by control means to restrict or prevent the delivery of pressure liquid to one or other of the slave cylinders or groups of slave cylinders.

In the application of our invention to a braking system for a tractor or like vehicle in which a master cylinder supplying liquid under pressure to the slave cylinders of brakes on wheels on opposite sides of the vehicle is actuated by operation of either or both of two pedals the master cylinder is connected to the slave cylinders through a control valve system incorporating two normally open valves which are not affected by simultaneous depression of both pedals but of which one is closed or allowed to close on depression of one pedal.

Some embodiments of my invention are illustrated by way of example in the accompanying drawings in which:

FIGURE 1 is a side elevation of a dual pedal control for hydraulic brakes on a tractor or like vehicle;

FIGURE 2 is a plan of the control shown in FIGURE 1;

FIGURES 3 and 4 are vertical sections on line 3—3 of FIGURE 1 showing the valve controlling means in two different positions;

FIGURE 5 is a vertical section of a selector valve suitable for use in the control shown in FIGURES 1 and 2;

FIGURE 6 is a section on the line 6—6 of the valve shown in FIGURE 5, embodying a different type of selector valve;

FIGURE 7 is a fragmentary section of another type of valve;

FIGURE 8 is a section of a further form of valve; and

FIGURE 9 is a section on the line 9—9 of FIGURE 8.

In the dual pedal control for an hydraulic braking system shown in FIGURES 1 to 4, the brakes on wheels on opposite sides of a vehicle are adapted to be applied by depression of either or both of two pedals 10, 11.

Application of the brakes on one side of the vehicle for steering is effected by depression of the appropriate pedal and application of the brakes on both sides for retarding the progress of the vehicle is effected by depressing both pedals which can be coupled together by a pivoted latch 12 in the known manner for simultaneous operation.

The pedals are freely mounted on a transverse shaft 13 which is itself mounted for angular movement in a fixed bracket 14. A boss 15 fixed on the shaft between the pedals has a depending arm 16 for actuating the piston of an hydraulic master cylinder 17 from which liquid under pressure is forced to the slave or wheel cylinders of the brakes on opposite sides of the vehicle through a selector valve 18 mounted on the bracket 14. The boss 15 is coupled to the pedals by dogs 19 providing a substantial degree of angular lost motion to allow the boss 15 to be moved angularly by either pedal without affecting the other pedal.

The pedals carry fingers 21, 22 projecting rearwardly and adapted to engage opposite ends of a beam 23 carried by a member 24 which is slidably connected to a member 124 pivoted at its lower end to a boss 125 fixed in the bracket 14. The outer lower side of the member 124 carries an abutment 126 whose upper side is engaged by the lower end of a compression spring 127 which operates on the member 24 to urge it upwardly until the ends of the beam 23 engage the respective fingers 21, 22. The member 124 is coupled to a rocking spindle 25 of the selector valve 18 by means of a bifurcated end part 128.

When both pedals are depressed simultaneously, the rocking spindle 25 remains in a vertical plane as shown in FIGURE 3 and allows liquid from the master cylinder to flow to the slave cylinders of the brakes on both sides of the vehicle. When only one pedal is depressed the spindle 25 is rocked over into the position shown in FIGURE 4 and cuts off the supply of liquid to the slave cylinders of the brakes normally applied by depression of the other pedal.

The selector valve may conveniently be of the construction shown in FIGURES 5 and 6.

In this valve, liquid from the master cylinder is delivered into an inlet port 31 in the bottom of the valve body 32 leading into a transverse bore 33 of which opposite ends are connected to outlet ports 34 and 35 adapted to be respectively connected by pipe lines to the slave cylinders of brakes on opposite sides of the vehicle.

A valve member 36 in the form of a piston is axially slidable in the bore 33 and has on opposite ends compressible washers adapted to engage opposite ends of the cylinder when the piston is moved to either side of the normal central position shown in the drawings, the piston having longitudinal grooves or flats on its periphery as shown in FIGURE 6 for the passage of liquid. The position of the piston is controlled by a rocking spindle 37 of which the lower end carries or is formed as a ball head 38 slidably engaged in a transverse slot 39 in the piston. At an intermediate point in its length, the spindle is formed with a collar 41 having a part-spherical upper surface which is in rocking engagement with a complementary concave part-spherical surface in a retaining nut 42 screwed on to an upstanding boss 43 on the body through which the spindle passes. The part-spherical surfaces on the collar and nut are held in engagement by a conical spring 44 interposed between the nut and the upper end of a boot or shroud 45 which fits over the upper part of the valve. Below the collar 41 the spindle passes through a coned opening in a hard rubber or other washer 46 and through a soft rubber sleeve 47 which acts as a seal and also, in conjunction with the spring 44, normally holds the spindle and valve member in the central position shown. In this position liquid from the master cylinder can flow freely to both outlet ports. Rocking movement of the spindle in a plane at right angles to the axis of the boss 33 does not affect the position of the valve member, but rocking movement in either direction in a plane containing the axis of the bore moves the valve member axially in the bore and the valve member cuts off communication between the inlet port and one or other of the outlet ports according to the direction in which the spindle is rocked.

In the valve shown in FIGURE 7, liquid from a master cylinder or the like is delivered into a chamber 51 in a valve body 52. Passages 53 lead from the chamber 51 into the lower ends of spaced vertical bores 54 and passages 55 lead out of the bores at intermediate points in their lengths to outlet ports adapted to be connected to slave cylinders which are to be selectively actuated. Spring-loaded pistons 56 working in the upper parts of the bores 54 and carrying seals 57 are adapted to be selectively operated by opposite ends of a lever 58 on a rocking shaft 59. Angular movement of the shaft in either direction causes one end of the lever 58 to move the corresponding piston 56 downwardly in its bore to close the passage 55 and cut off communication between the chamber 51 and the outlet into which that passage leads.

In the valve shown in FIGURES 8 and 9, liquid from a master cylinder or other source of liquid under pressure is delivered through an inlet port 61 into a chamber 62 in a body 63. Spaced outlet ports 64 and 65 are connected to the chamber 62 through tilting spring-loaded valves 66 and 67 of known type having upstanding stem portions 68. These are engaged by resilient fingers on a bar 69 rotatably mounted on a spindle 71 which is itself rotatably mounted in the valve body. This bar is loaded by a torsion spring 72 which in conjunction with stops 73 maintains the bar normally in such a position that the fingers hold the valves in the tilted or open position so that liquid can flow freely from the inlet port 61 to both outlet ports.

The spindle carries at its upper end a cross bar 74 by which it can be moved angularly, and mounted on the spindle within the chamber 62 is a fork 75 which, when the spindle is moved angularly in either direction from its normal position, moves the bar 69 and fingers angularly to allow one of the valves to close and so to prevent liquid from passing from the chamber into the corresponding outlet port.

In any of the valve assemblies described above, the movement or release of a valve member from the open position may be arranged only to restrict or reduce the flow of liquid to a slave cylinder or cylinders instead of cutting it off completely.

I claim:

1. An hydraulic braking system for a vehicle having two sets of brakes operable independently and simultaneously, comprising two pedals mounted for simultaneous and independent angular movement about a fixed axis, a master cylinder for supplying fluid under pressure to both sets of brakes, means operatively connecting the pedals to the master cylinder, a selector valve for controlling the supply of pressure fluid from the master cylinder to the brakes, means operatively connecting each pedal to the selector valve, said selector valve being normally open to permit pressure fluid to flow from the master cylinder to both sets of brakes when both pedals are moved angularly and simultaneously, and means incorporated in said selector valve actuated by differential movement of the pedals to restrict and prevent the supply of pressure fluid to either set of brakes while permitting the delivery of pressure fluid to the other set of brakes.

2. An hydraulic braking system for applying independently and simultaneously sets of hydraulic brakes on opposite sides of a vehicle, comprising two pedals mounted for simultaneous and indepenent angular movement about a fixed axis, a master cylinder for supplying hydraulic fluid under pressure to both sets of brakes, means operatively connecting the pedals to the master cylinder, a selector valve for controlling the supply of fluid pressure from the master cylinder to both sets of brakes, means operatively connecting each pedal to the selector valve, said selector valve being normally open to permit pressure fluid to flow from the master cylinder to both sets of brakes when both pedals are moved angularly and simultaneously, and means incorporated in said selector valve actuated by differential movement of the pedals to restrict and prevent the supply of pressure fluid to the brakes on one side of the vehicle while permitting the delivery of pressure fluid to the brakes on the opposite side of the vehicle.

3. An hydraulic braking system for supplying fluid to slave cylinders of brakes on wheels on opposite sides of a vehicle independently and simultaneously, comprising two pedals mounted for simultaneous and independent angular movement about a fixed axis, a master cylinder for supplying fluid under pressure to both sets of brakes, means operatively connecting the pedals to the master cylinder, a selector valve for controlling the supply of pressure fluid from the master cylinder to the brakes, said selector valve comprising a body member, a bore in said body member having an inlet connected to the master cylinder and having at opposite ends outlets for connection to separate slave cylinders on the wheels on opposite sides of the vehicle, and a valve member working in the bore and adapted to engage either end of the bore to close the outlet for that end, a rocking spindle for actuating the valve member and having a ball end engaging in a slot in the valve member, and means for connecting each pedal to the rocking spindle, whereby independent angular movement of either pedal moves the rocking spindle in a plane containing the axis of the bore in the body member, the valve member being adapted to close the outlet from one end of the bore while permitting fluid to flow from the outlet at the opposite end to the slave cylinders of the brakes on one side of the vehicle, and upon simultaneous angular movement of both pedals pressure fluid is permitted to flow from both outlets to the slave cylinders on the wheels on both sides of the vehicle.

4. An hydraulic braking system as claimed in claim 3, and including a spring which biasses said rocking spindle into a position in which it normally holds the valve member in a position midway between the ends of the bore.

5. An hydraulic braking system for supplying fluid to slave cylinders of brakes on wheels on opposite sides of a vehicle independently and simultaneously, comprising two pedals mounted for simultaneous and independent angular movement about a fixed axis, a master cylinder for supplying fluid under pressure to both sets of brakes, means operatively connecting the pedals to the master cylinder, a selector valve for controlling the supply of pressure fluid from the master cylinder to the brakes, said selector valve comprising a valve body adapted to be connected to the master cylinder, two spaced bores in said valve body, outlet passages leading from the bores and adapted to be connected to separate slave cylinders on the wheels on opposite sides of the vehicle, pistons working on the bores, a rocking shaft, and a lever on said rocking shaft of which opposite ends selectively actuate said pistons, and means for connecting each pedal to the rocking shaft, whereby independent angular movement of either pedal moves said rocking shaft angularly and moves one of said pistons in its bore to close the outlet passage from that bore while permitting fluid to flow from the outlet passage in the other bore to the slave cylinders of the brakes on one side of the vehicle, and upon simultaneous angular movement of both pedals pressure fluid is permitted to flow from both outlet passages from the bores to the slave cylinders on the wheels on both sides of the vehicle.

6. An hydraulic braking system forsupplying fluid to slave cylinders of brakes on wheels on opposite sides of a vehicle independently and simultaneously, comprising two pedals mounted for simultaneous and independent angular movement about a fixed axis, a master cylinder for supplying fluid under pressure to both sets of brakes, means operatively connecting the pedals to the master cylinder, a selector valve for controlling the supply of pressure fluid from the master cylinder to the brakes, said selector valve comprising a valve body, a chamber in said valve body having an inlet connected to the master cylinder and having a pair of spaced outlets adapted to be connected to slave cylinders on the wheels on opposite sides of the vehicle, a spring-loaded tilting valve controlling each outlet, and spring-loaded means adapted to normally hold open said tilting valves, an angularly movable control member connected to the pedals and operable upon angular movement of either pedal to close one of said tilting valves and prevent pressure fluid from flowing to the slave cylinders on the wheels of that side of the vehicle, and upon simultaneous angular movement of both pedals, said spring-loaded means are adapted to hold open both said tilting valves and fluid is permitted to flow from the chamber in said valve body past both tilting valves and to the slave cylinders on the wheels on both sides of the vehicle.

References Cited by the Examiner
UNITED STATES PATENTS

| | | | |
|---|---|---|---|
| 829,120 | 8/1906 | Mumford | 137—625.5 |
| 2,556,287 | 6/1951 | Milster | 188—152 |
| 2,741,337 | 4/1956 | Ziskal | 188—152 |
| 3,180,360 | 4/1965 | Paulin | 137—625.5 |

MILTON BUCHLER, *Primary Examiner.*

G. E. A. HALVOSA, *Assistant Examiners.*